US010110071B2

(12) United States Patent
Akuzawa et al.

(10) Patent No.: US 10,110,071 B2
(45) Date of Patent: Oct. 23, 2018

(54) RESONANCE-TYPE POWER TRANSMITTER

(71) Applicant: Mitsubishi Electric Engineering Company, Limited, Chiyoda-ku (JP)

(72) Inventors: Yoshiyuki Akuzawa, Chiyoda-ku (JP); Kiyohide Sakai, Chiyoda-ku (JP); Toshihiro Ezoe, Chiyoda-ku (JP); Kansuke Tsuji, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 132 days.

(21) Appl. No.: 15/504,862

(22) PCT Filed: Sep. 12, 2014

(86) PCT No.: PCT/JP2014/074276
§ 371 (c)(1),
(2) Date: Feb. 17, 2017

(87) PCT Pub. No.: WO2016/038737
PCT Pub. Date: Mar. 17, 2016

(65) Prior Publication Data
US 2017/0279312 A1    Sep. 28, 2017

(51) Int. Cl.
*H02J 50/12*    (2016.01)
*H02J 5/00*    (2016.01)

(52) U.S. Cl.
CPC .................... *H02J 50/12* (2016.02)

(58) Field of Classification Search
None
See application file for complete search history.

(56) References Cited

U.S. PATENT DOCUMENTS 8,890,367 B2 * 11/2014 Kim .................. H02J 50/12
                                                      307/104
9,444,264 B2 *  9/2016 Eyales ............... H02K 53/00
(Continued)

FOREIGN PATENT DOCUMENTS

JP    2012-152041 A    8/2012
JP    2013-21769 A     1/2013
(Continued)

OTHER PUBLICATIONS

International Search Report dated Oct. 7, 2014, in PCT/JP2014/074276, filed Sep. 12, 2014.
(Continued)

*Primary Examiner* — Jared Fureman
*Assistant Examiner* — Aqeel Bukhari
(74) *Attorney, Agent, or Firm* — Oblon, McClelland, Maier & Neustadt, L.L.P.

(57) ABSTRACT

A configuration includes: resonance-type power source circuits provided for at least two electric paths, each including a power element that performs switching at a high frequency of 2 MHz or more, and a resonant circuit element that causes the power element to perform resonant switching; a phase-control-type matching circuits provided for the respective electric paths, each having a function of controlling a phase difference between output currents of the resonance-type power source circuits and a function of providing matching of resonance conditions between the resonance-type power source circuit and a load; and a combining unit that combines output currents processed by the phase-control-type matching circuits for the respective electric paths.

6 Claims, 7 Drawing Sheets

(56) References Cited

U.S. PATENT DOCUMENTS

| | | |
|---|---|---|
| 2012/0169139 A1 | 7/2012 | Kudo |
| 2013/0009475 A1 | 1/2013 | Nunoya et al. |
| 2013/0293192 A1 | 11/2013 | Abe et al. |
| 2013/0300205 A1* | 11/2013 | Tzanidis .............. H04B 5/0037 307/104 |
| 2016/0380484 A1* | 12/2016 | Eyales ................... H02K 53/00 307/104 |

FOREIGN PATENT DOCUMENTS

| | | |
|---|---|---|
| JP | 2013-169120 A | 8/2013 |
| JP | 2013-225962 A | 10/2013 |
| WO | 2011/077488 A1 | 6/2011 |
| WO | 2013/105279 A1 | 7/2013 |

OTHER PUBLICATIONS

Kimishima, Ami et al., "Design of Inductive Coupled Wireless Power Transfer System Using Class $E^2$ dc/dc Converter," Proceedings of the General Conference of the Institute of Electronics, Information and Communication Engineers, No. BCS-1-16, 2013, 1 page.

* cited by examiner

RESONANCE-TYPE POWER TRANSMITTER

TECHNICAL FIELD

The invention relates to a resonance-type power transmitter that transmits electric power at a high frequency of 2 MHz or more.

BACKGROUND ART

Figure 8:
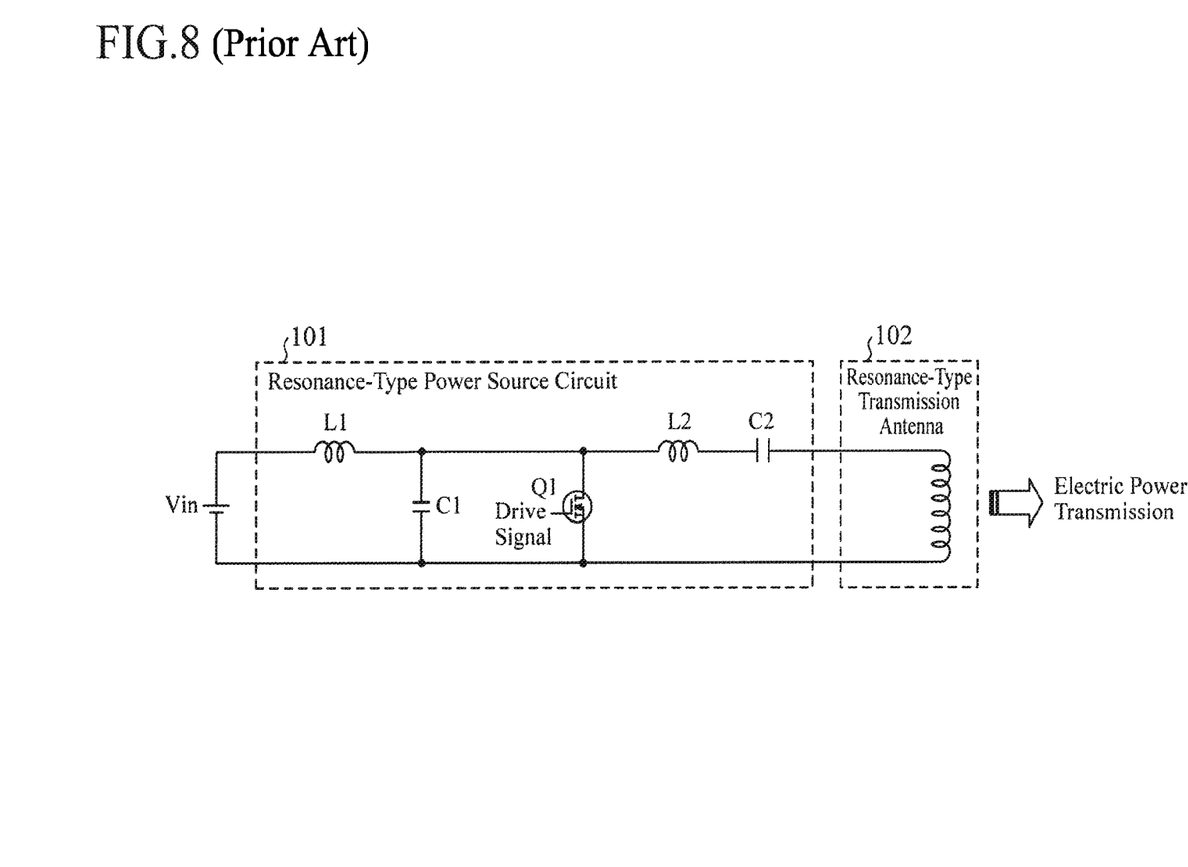
FIG. 8 is a circuit diagram showing the configuration of a conventional resonance-type power transmitter.

FIG. 8 shows a resonance-type power transmitter according to a conventional art. In the resonance-type power transmitter, a resonance-type transmission antenna 102 is connected to the output of a class-E resonance-type power source circuit 101 (e.g., see Non Patent Literature 1).

CITATION LIST

Non Patent Literature

Non Patent Literature 1: Proceedings of the General Conference of the Institute of Electronics, Information and Communication Engineers, No. BCS-1-16, 2013.

SUMMARY OF INVENTION

Technical Problem

However, in the conventional art, since the resonance-type power transmitter is configured with the class-E resonance-type power source circuit 101, it is necessary to allow the level of an input voltage Vin to be variable in order to allow electrical power for transmission to be variable. This is because, in accordance with characteristics of a class-E power source, it is not possible to allow an output voltage to be variable by using the time ratio (duty) of the switching time of a power element Q1.

Therefore, in the conventional art, in order to allow the level of the input voltage Vin to be variable, it is necessary to implement a DC/DC converter (power source device) at the input portion. Further, in order to transmit larger electrical power, it is necessary to adopt a high-voltage high-power element as the power element Q1 of the resonance-type power source circuit 101.

As a result, there is the problem with the resonance-type power source circuit 101 that it is difficult to obtain both of the larger electrical power and its higher frequency, resulting in difficulty of high-efficiency power conversion. In addition, since the power conversion efficiency of the entire device is reduced due to the existence of the DC/DC converter of the input portion, there is the problem that countermeasure components against heat radiation is required, thus causing difficulty in achieving reductions in the size and weight of the device.

In addition, in the conventional art, both the switching frequency of the DC/DC converter and the switching frequency of the resonance-type power source circuit 101 are used. Accordingly, a large number of countermeasure components against noises for EMC or the like are required, thus causing the increase of the number of components and difficulty in reducing its cost.

As a method for transmitting larger electrical power without controlling the level of the input voltage Vin to be variable, a method using a combiner that combines outputs of RF amplifiers is known. Such a combiner is mainly classified into two types: one type is a combiner that achieves impedance matching by disposing resistors each having 50Ω at all of input paths and combining output paths, and performs electrical power combining; and the other type is a combiner that achieves input/output impedance matching by using windings of a transformer and performs electrical power combining. However, these combiners have low efficiencies of power conversion (efficiency of 50%), and are not suitable as combiners for use in electrical power transmitters.

The invention has been made in order to solve the above problems, and an object of the invention is to provide a resonance-type power transmitter which is capable of achieving large electrical power for transmission and variably controlling the electrical power without the use of a DC/DC converter, and is capable of performing electric power transmission with high efficiency at a high frequency of 2 MHz or more.

Solution to Problem

A resonance-type power transmitter according to the invention includes: resonance-type power source circuits provided for at least two electric paths, each resonance-type power source circuit having two output ends for outputting an alternating current having a frequency of 2 MHz or more; phase-control-type matching circuits connected to the respective resonance-type power source circuits, each phase-control-type matching circuit including an inductor that has one end being connected to one of the two output ends of a corresponding one of the resonance-type power source circuits, and a capacitor that has one end being connected to either the one end of the inductor or the other end of the inductor, the capacitor having the other end being connected to the other of the two output ends of the corresponding one of the resonance-type power source circuits; and a combining unit connected to the other ends of the inductors of the phase-control-type matching circuits, configured to combine outputs of the phase-control-type matching circuits.

Advantageous Effects of Invention

According to the invention, since the configuration as described above is provided, with variable control of the electrical power can be produced without the use of a DC/DC converter, and electric power transmission with high efficiency at a high frequency of 2 MHz or more can be performed.

BRIEF DESCRIPTION OF DRAWINGS

FIGS. 4A and 4B are views for describing an operation of the resonance-type power transmitter according to the first embodiment of the invention, in which

DESCRIPTION OF EMBODIMENTS

Detailed descriptions of embodiments of the invention will be provided below with reference to the drawings.

First Embodiment

Figure 1:
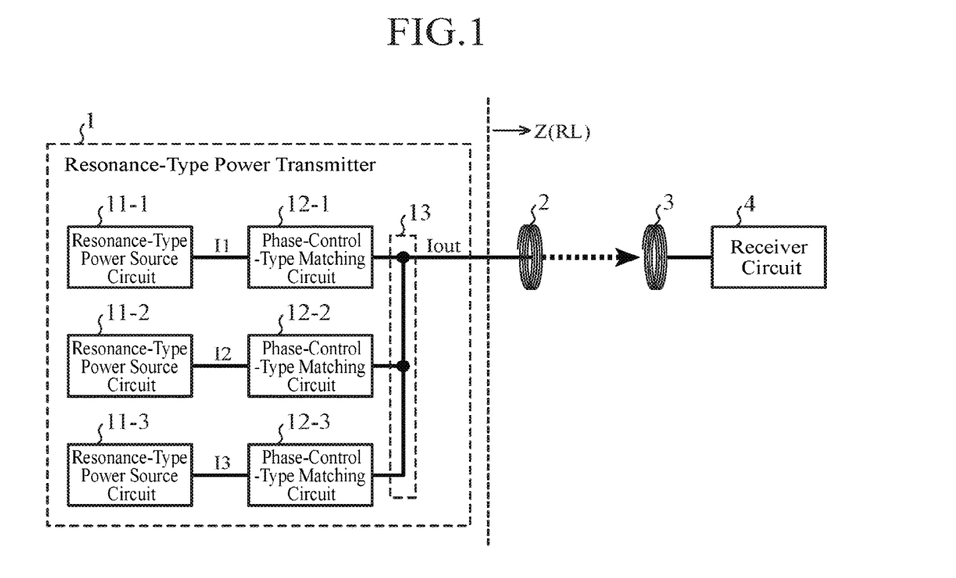
FIG. 1 is a view showing a configuration of a resonance-type electric power transmission system that includes a resonance-type power transmitter according to a first embodiment of the invention.

FIG. 1 is a view showing a configuration of a resonance-type electric power transmission system that includes a resonance-type power transmitter 1 according to a first embodiment of the invention.

As shown in FIG. 1, the resonance-type electric power transmission system is configured to include the resonance-type power transmitter 1, a resonance-type transmission antenna 2, a resonance-type reception antenna 3, and a receiver circuit 4. The resonance-type power transmitter 1 is configured to include resonance-type power source circuits 11 (e.g., class-E power source circuits or the like) and phase-control-type matching circuits 12 to be provided for at least two electric paths, and a combining unit 13. A load impedance Z (RL) of the resonance-type power transmitter 1 is the combined impedance that is formed by the resonance-type transmission antenna 2, the resonance-type reception antenna 3, the receiver circuit 4, a load equipment and other components (not shown) which are connected to the receiver circuit 4. Thus, the system may be configured to include a resistive load or the like. It should be noted that, in the drawings, the resonance-type power source circuits 11 and the phase-control-type matching circuits 12 are provided for three electric paths, and are distinguished from one another by adding suffixes (1 to 3) to the reference numerals of the individual circuits.

The resonance-type power source circuits 11 constituting the resonance-type power transmitter 1 are disposed at a stage prior to the phase-control-type matching circuits 12, and control the supply of electrical power to the resonance-type transmission antenna 2 forming the load impedance. The resonance-type power source circuits 11 are inverter power source circuits into which direct current or alternating current are inputted, and output alternating current. As the resonance-type power source circuit 11, any type of resonance-type power source circuits capable of operating at frequencies in the MHz band, such as class-E power source circuits, can be used.

The phase-control-type matching circuits 12, which constitute the resonance-type power transmitter 1, have functions of controlling the phase differences between output currents of the resonance-type power source circuits 11 and the matching function to provide matching of resonance conditions between the resonance-type power source circuit 11 and the resonance-type transmission antenna 2 (load) which forms the load impedance.

The combining unit 13 constituting the resonance-type power transmitter 1 combines output currents processed in the phase-control-type matching circuits 12 of the respective electric paths, and thereby a composite output current is obtained.

The resonance-type transmission antenna 2 is a resonance-type electric power transmission antenna (not limited to a non-contact type) that transmits electrical power which is provided from the resonance-type power source circuit 11, to the resonance-type reception antenna 3. The resonance-type transmission antenna 2 receives the composite output current which is alternating current obtained by combining the output currents of the resonance-type power source circuits 11 of the respective electric paths in the combining unit 13, generates electrical power for transmission by resonance operation, and transmits the electric power to the resonance-type reception antenna 3. The resonance-type transmission antenna 2 can be formed by any coil shape such as a helical shape or spiral shape. The resonance-type transmission antenna 2 may be configured by a pair of an excitation coil and a non-excitation coil.

The resonance-type reception antenna 3 is a resonance-type electrical power reception antenna (not limited to a non-contact type) that receives electrical power from the resonance-type transmission antenna 2. The electrical power received by the resonance-type reception antenna 3 is supplied to the load equipment or the like (not shown) via the receiver circuit 4. The resonance-type reception antenna 3 is formed of any coil shape such as a helical shape or spiral shape. In addition, the resonance-type reception antenna 3 may be configured by a pair of an excitation coil and a non-excitation coil. It should be noted that the resonance frequency of the resonance-type reception antenna 3 is set up to form a resonant coupling with the resonance-type transmission antenna 2.

The receiver circuit 4 is disposed between the resonance-type reception antenna 3 and the load equipment, and rectifies electrical power (AC output) received from the resonance-type reception antenna 3. The receiver circuit 4 is the AC-input and DC-output type power source circuit.

In this regard, the transmission method of the resonance-type electric power transmission system for wireless electric power transmission is not particularly limited, and may be any of a method using magnetic resonance, a method using electrical resonance, and a method using electromagnetic induction.

Next, descriptions will be given for a specific example of the circuitry of the resonance-type power transmitter 1 shown in FIG. 1, with reference to FIG. 2. In the resonance-type power transmitter 1 shown in FIG. 2, the resonance-type power source circuits 11 and the phase-control-type matching circuits 12 provided for three electric paths are shown.

Herein, a resonance-type power source circuit 11-1 is constituted by a power element Q1, a resonance circuit element (a capacitor C1, an inductor L2, and a capacitor C2), an inductor L1, and a radio-frequency pulse drive circuit (not shown). A phase-control-type matching circuit 12-1 is constituted by a matching element (capacitors C3 and C4 and an inductor L3). Resonance-type power source circuits 11-2 and 11-3 and phase-control-type matching circuits 12-2 and 12-3 provided for the other electric paths have the same configurations as those of the resonance-type power source circuit 11-1 and the phase-control-type matching circuit 12-1. Each of FIGS. 1 and 2 shows a configuration in which the resonance-type power source circuits 11 and the phase-control-type matching circuits 12 are provided for three electric paths disposed in parallel, but the invention is not limited thereto. The number of electric paths disposed in parallel is determined based on the amount of electrical power for transmission.

The power element Q1 is a switching element that performs switching at a high frequency of 2 MHz or more to convert an input voltage (DC voltage) Vin into alternating current. As the power element Q1, a field effect transistor (FFT) for use in radio-frequency (RF) can be used, no limitation thereto intended. A power element such as an Si-MOSFET, SiC-MOSFET, or GaN-FET can be used.

The resonance circuit elements (the capacitor C1, the inductor L2, and the capacitor C2) cause their respective corresponding power elements Q1 to perform resonant switching. As each of the capacitors C1 and C2, a ceramic capacitor or film capacitor can be used. In addition, as the inductor L2, an air-core coil or magnetic inductor can be used.

The inductor L1 temporarily retains energy of the DC voltage Vin in every interval of the switching operation of the corresponding power element Q1. As the inductor L1, the magnetic inductor or the like can be used.

The radio-frequency pulse drive circuit is a circuit that sends a pulsed voltage signal having a high frequency of 2 MHz or more to the gate terminal of the power element Q1 to drive the power element Q1. The radio-frequency pulse drive circuit is a circuit in which an output unit has a totem pole circuit configuration with an FET element or the like to be capable of a high-speed ON/OFF output.

The phase-control-type matching circuit 12-1 (the capacitors C3 and C4 and the inductor L3) adjusts and controls the phase relationship with the output currents of the resonance-type power source circuits 11-2 and 11-3 provided for the other electric paths by the function of controlling the phase of the output current of the resonance-type power source circuit 11-1. In addition, the phase-control-type matching circuit 12-1 also has the matching function of providing matching of the resonance conditions between the resonance-type power source circuit 11-1 and the resonance-type transmission antenna 2 forming the load impedance Z (RL). In this regard, the composite transmission characteristic of the phase-control-type matching circuits 12-1 to 12-3 provided for the respective electric paths is adjusted in working frequency to be equal to the transmission characteristic of the phase-control-type matching circuit 12, obtained on the assumption that the resonance-type power source circuit 11 is provided for a single electric path as shown in FIG. 3.

As each of the capacitors C3 and C4, a ceramic capacitor or film capacitor can be used. In addition, as the inductor L3, an air-core coil or magnetic inductor can be used.

It should be noted that a capacitor C5 of the resonance-type transmission antenna 2 is used to set the resonance condition of the resonance-type transmission antenna 2. As the capacitor C5, a ceramic capacitor or film capacitor can be used.

Next, a description will be given of the operation of the resonance-type electric power transmission system configured in the manner described above. In the following description, the operation in an upper circuit shown in FIG. 2 will be described. In addition, it is assumed that the DC voltage Vin is input to the resonance-type power source circuit 11-1.

First, the DC voltage Vin of a primary power source (not shown) is input to the resonance-type power source circuit 11-1. The input DC voltage Vin is converted into high-frequency alternating current in the MHz band, and the high-frequency alternating current is output to the phase-control-type matching circuit 12-1. The output is subjected to the phase control of the current by the phase-control-type matching circuit 12-1, and the resonance conditions between the resonance-type power source circuit 11-1 and the resonance-type transmission antenna 2 are matched with each other. Subsequently, the output is combined with the outputs of the other electric paths by the combining unit 13, and is input to the resonance-type transmission antenna 2.

In the specific operation of the resonance-type power source circuit 11-1, the DC voltage Vin is first applied to the drain terminal of the power element Q1 through the inductor L1. Subsequently, the power element Q1 converts the voltage into a positive AC voltage by ON/OFF switching. At the time of the conversion, the inductor L1 temporarily retains its energy, and assists the power conversion from the DC voltage into the AC voltage.

Herein, with regard to the switching of the power element Q1, a resonant switching condition is set in the resonance circuit element constituted by the capacitor C1, the inductor L2, and the capacitor C2, such that ZVS (zero voltage switching) is established to minimize a switching loss due to the product of an Ids current and a Vds voltage. By the resonant switching, a sinusoidal AC voltage based on an RTN potential is output to the output port.

The driving of the power element Q1 is executed by inputting the pulsed voltage signal provided by the radio-frequency pulse drive circuit, to the C gate terminal of the power element Q1. At this point, the driving frequency of the power element Q1 serves as an operation frequency in the resonance-type power transmitter 1, and is determined on the basis of the setting of an oscillator circuit (not shown) that generates a reference signal in the radio-frequency pulse drive circuit.

Figure 2:
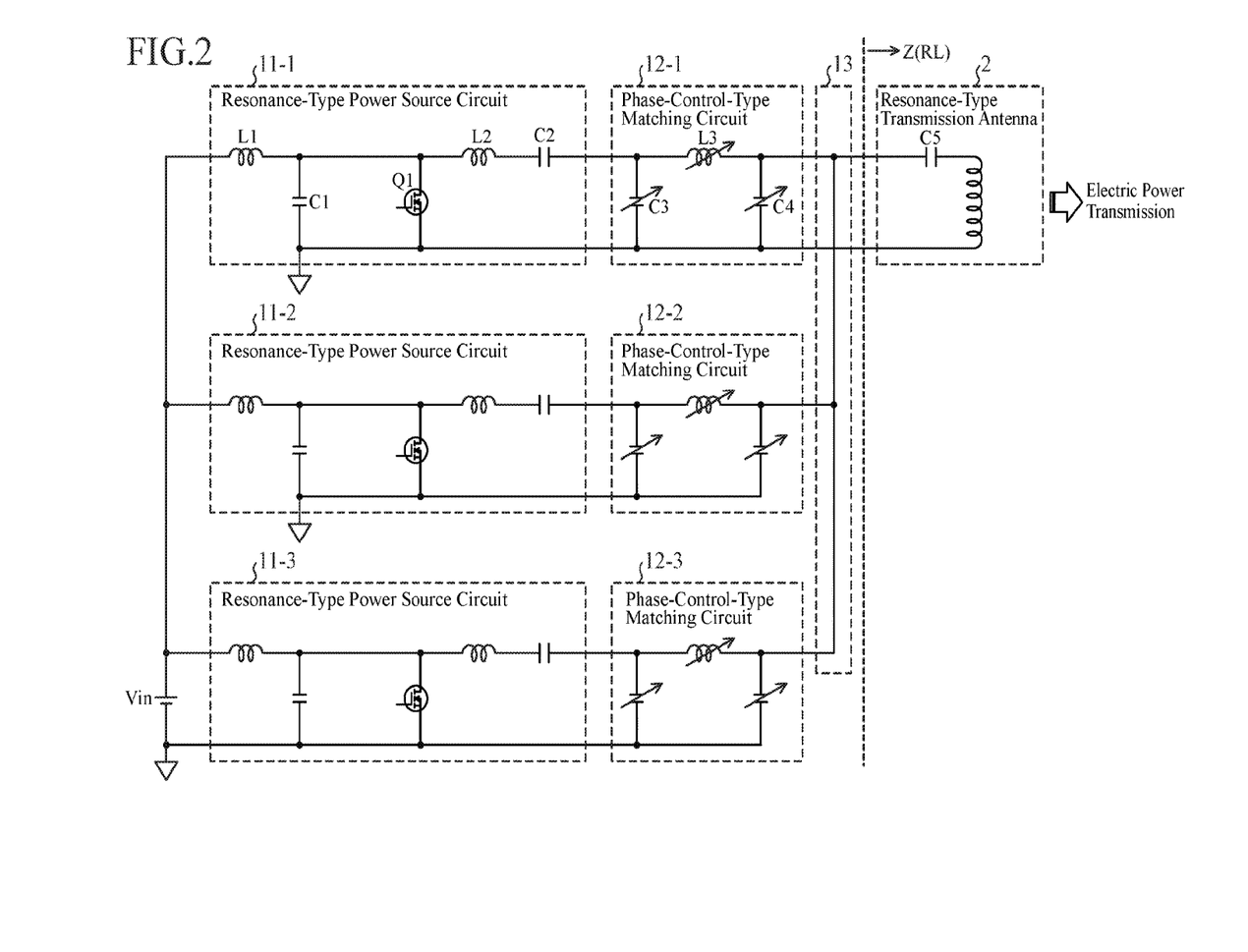
FIG. 2 is a view showing a circuit structure of the resonance-type power transmitter according to the first embodiment of the invention.
Figure 3:
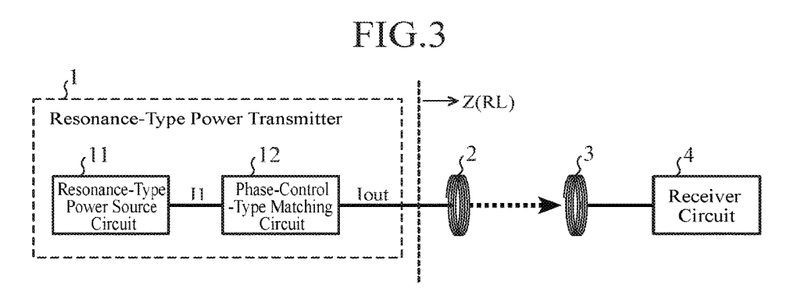
FIG. 3 is a view showing the case where a resonance-type power source circuit is provided for a single electric path in the resonance-type power transmitter according to the first embodiment of the invention.

The circuits for the other electric paths shown in FIG. 2 have the same operation as that described above. The drive timing of the power element provided for each electric path may be set for either a combination of the same frequency and the same phase, or a combination of the same frequency and different phases.

Figure 4A:
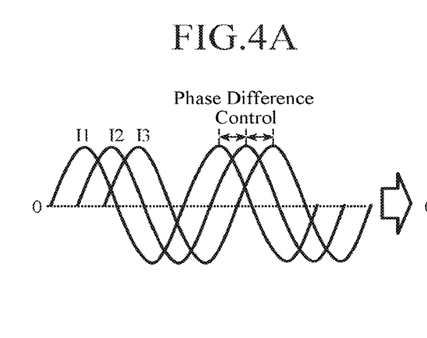
FIG. 4A is a view showing the waveforms of output currents of the resonance-type power source circuits for three electric paths and FIG. 4B is a view showing the waveform of a composite output current.
Figure 4B:
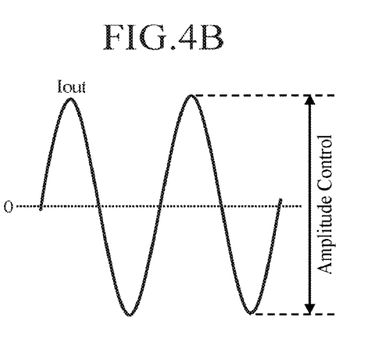

Thereafter, the phase control of the output current is executed by the phase-control-type matching circuits 12-1 to 12-3 in accordance with the amount of electrical power for transmission. Herein, as shown in FIG. 4A, the sum of output currents I1, I2, and I3 from the resonance-type power source circuits 11-1 to 11-3 forms a composite output current Iout. Accordingly, the variable controlling the phase differences between the output currents I1, I2, and I3 are performed to obtain the desired amount of electrical power for transmission.

Thereafter, the output currents are combined by the combining unit 13, and the composite output current is obtained.

Then, the resonance-type transmission antenna 2 exhibits a resonance in response to the composite output current, and transmits electric power to the resonance-type reception antenna 3.

Thereafter, similarly to the resonance-type transmission antenna 2, the resonance-type reception antenna 3 exhibits a resonance in response to the electric power transmitted from the resonance-type transmission antenna 2. At this point, in the electrical power received by the resonance-type reception antenna 3, the amplitude of the voltage is controlled by controlling the amount of transmission electrical power. Subsequently, the resonance-type reception antenna 3 outputs AC electrical power to the receiver circuit 4. Thereafter, the receiver circuit 4 rectifies the AC electrical power and outputs DC.

Thus, according to the first embodiment, since the resonance-type power transmitter 1 is configured to include the resonance-type power source circuits 11 and the phase-control-type matching circuits 12 provided for at least two electric paths, and include the combining unit 13, the output currents of the respective electric paths are combined after the phase control of the output currents is performed in accordance with the amount of electrical power for transmission, thereby achieving large electrical power for transmission and the variable controlling the electrical power for transmission without using a DC/DC converter in the input portion, and enabling electric power transmission at a high frequency of 2 MHz or more.

In addition, it is possible to reduce the number of components as compared with the conventional configuration, allowing the reduction of its cost. Further, it is possible to improve the power conversion efficiency of the entire device as compared with the conventional configuration, thus enabling the simplification of countermeasures against heat radiation, and achieving the reduction of the size and weight of the device. Furthermore, in contrast to the conventional configuration, only the switching frequency of the resonance-type power source circuit 11 is used in the internal circuit, and hence it is possible to significantly reduce the number of countermeasure components against noises for EMC.

Figure 5:
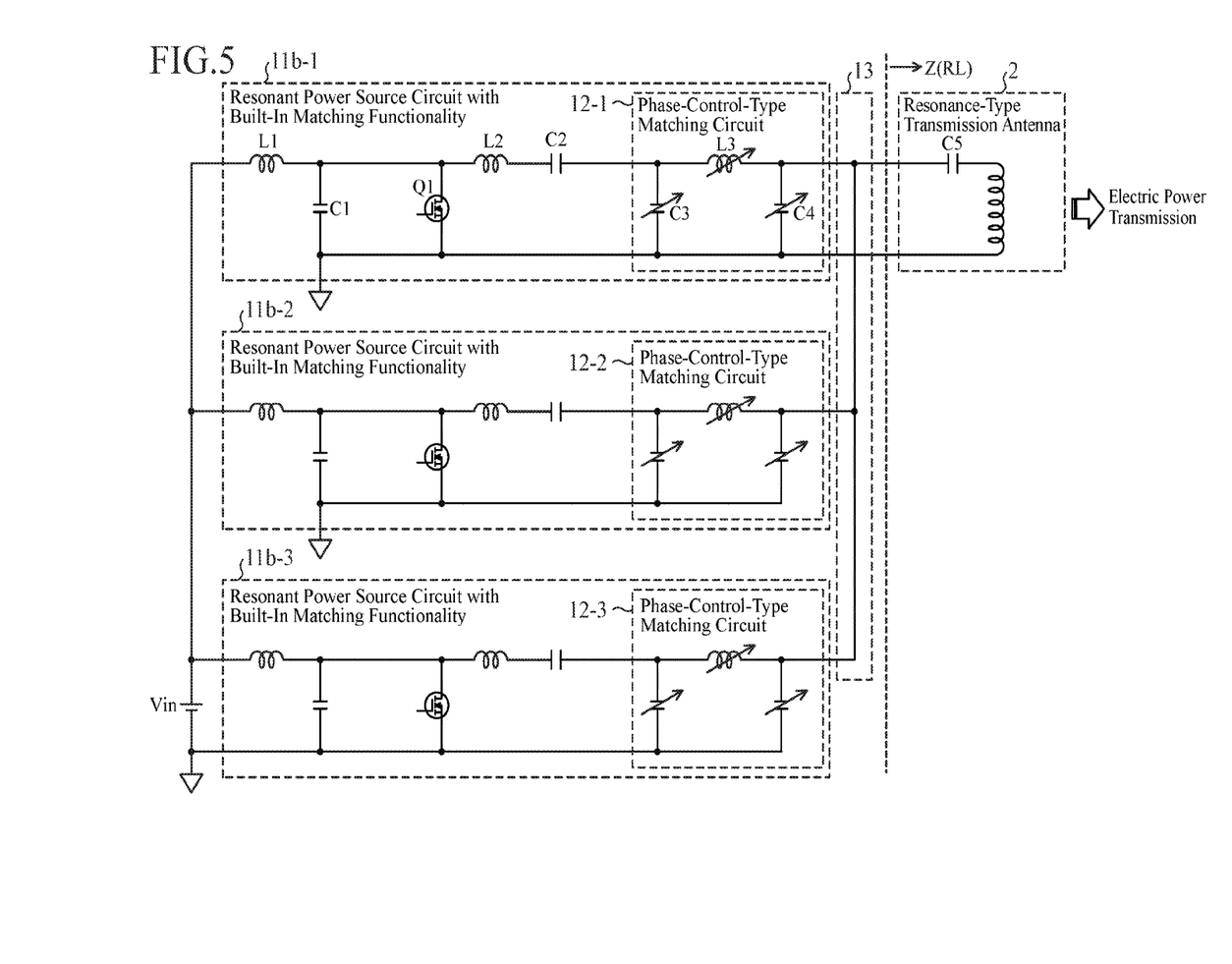
FIG. 5 is a view showing another circuit structure of the resonance-type power transmitter according to the first embodiment of the invention.

It should be noted that, in the above descriptions, the circuit structure shown in FIG. 2 as the example of the configuration of the resonance-type power transmitter 1 has been described, no limitation thereto intended. A circuit structure as shown in FIG. 5 may also be applied. FIG. 5 shows a resonant power source circuit 11b with build-in matching functionality in which part of the phase-control-type matching circuit 12 as shown in FIG. 2 is configured as part of the internal circuit of the resonance-type power source circuit 11.

Figure 6:
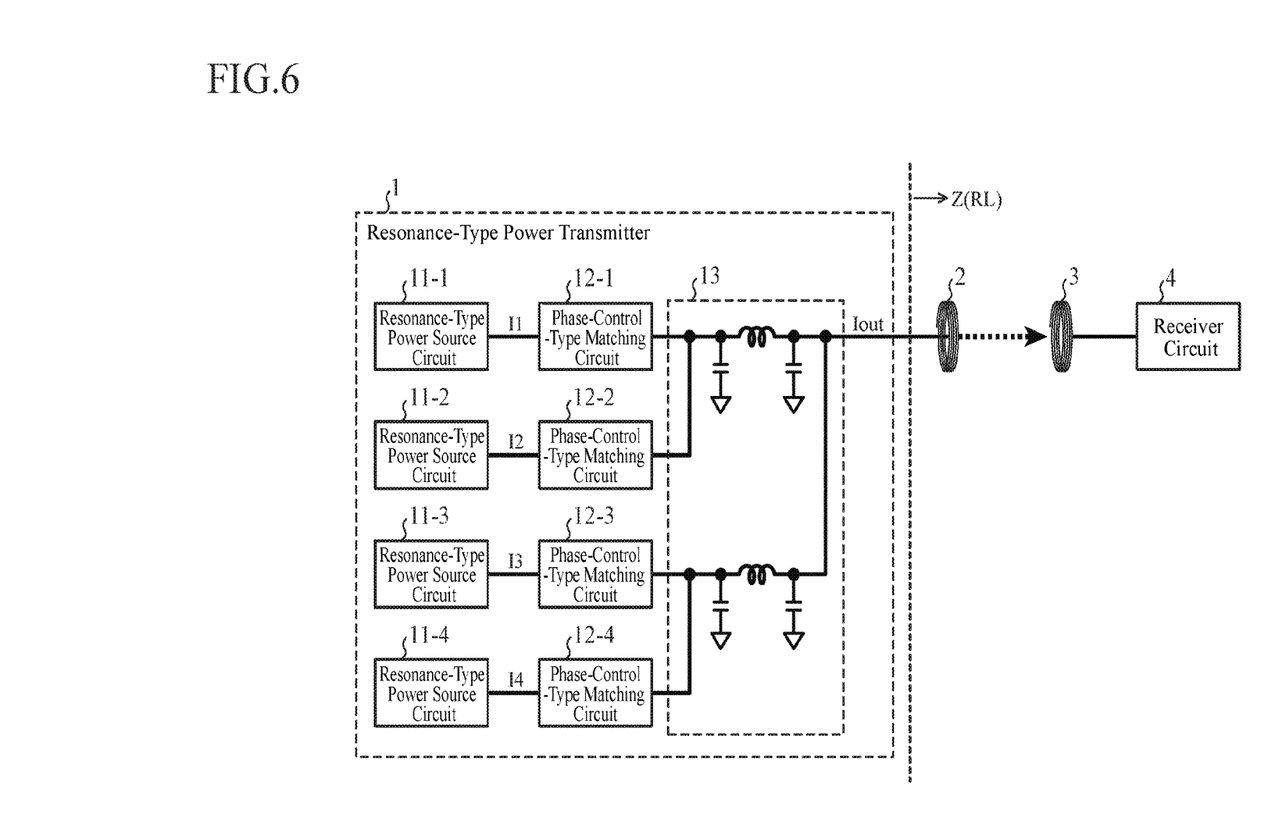
FIG. 6 is a view showing still another configuration of the resonance-type power transmitter according to the first embodiment of the invention.

In addition, as shown in FIG. 6, an impedance matching circuit may be provided in a combining unit 13, and the number of parallel pairs of the resonance-type power source circuit 11 and the phase-control-type matching circuit 12 may be increased based on the number of impedance matching circuits.

Second Embodiment

In a second embodiment, a configuration will be described in which the adjustment control of a phase-control-type matching circuit 12 is automatically performed.

Figure 7:
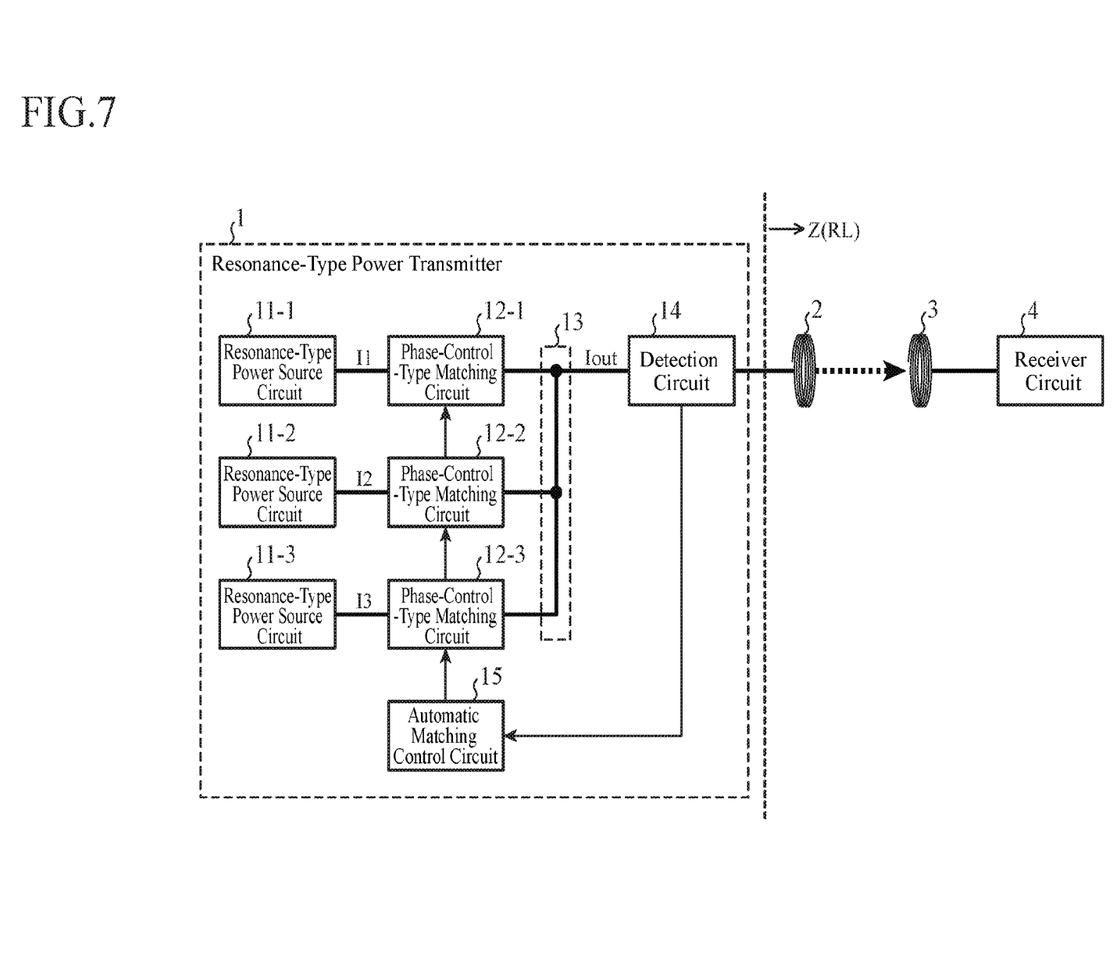
FIG. 7 is a view showing a configuration of the resonance-type electric power transmission system that includes a resonance-type power transmitter according to a second embodiment of the invention.

FIG. 7 is a view showing a configuration of the resonance-type electric power transmission system that includes a resonance-type power transmitter 1 according to the second embodiment of the invention. The resonance-type power transmitter 1 according to the second embodiment shown in FIG. 7 is configured by adding a detection circuit 14 and an automatic matching control circuit 15 to the resonance-type power transmitter 1 according to the first embodiment shown in FIG. 1. Other configurations thereof is the same as those of the first embodiment, and hence the same components as those in the first embodiment are designated by the same reference numerals, and only components different from the first embodiment will be described.

The detection circuit 14 has a function of detecting the level (an amplitude, an average value, a distortion, or the like) of the composite output current that is obtained by the combining unit 13. The detection circuit 14 operates by performing, for example, non-contact detection using a current transformer or detection using a resistor. It should be noted that the detection circuit 14 may have a function of performing other detections about other circuit components. The detection circuit 14 may also be a circuit that has a function of detecting the level of a current (not shown) as an input to the resonance-type power source circuit 11 provided for each electric path, detecting the level of an output current or output voltage (not shown) of the resonance-type power source circuit 11 for each electric path, and/or detecting the level of an output current (not shown) of the phase-control-type matching circuit 12 provided for each electric path. In this way, the detection circuit 14 may use any method as long as the method has the function of detecting the state of a power flow of each electric path.

The automatic matching control circuit 15 variably controls the transmission characteristic of the phase-control-type matching circuit 12 on the basis of the result of the detection by the detection circuit 14. With this, it is possible to automatically control the phase of the output current of each electric path, and possible to implement the automatic matching function of providing matching of resonance conditions between the resonance-type power source circuit 11 and the load impedance Z (RL). The automatic matching control circuit 15 is implemented by the circuit structure suitable for a control region and accuracy such as the circuit structure constituted by an analog control circuit or the circuit structure constituted by a microcomputer control circuit.

As described above, according to the second embodiment, the level of the composite output current is detected by the detection circuit 14 and the control of the phase-control-type matching circuit 12 is performed in the automatic matching control circuit 15 on the basis of the detection result. Therefore, the effect of the first embodiment can be achieved, and it is possible to automatically perform the adjustment control of the phase-control-type matching circuit 12.

It is to be understood that, within the scope of the invention, an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted.

INDUSTRIAL APPLICABILITY

The resonance-type power transmitter according to the invention is capable of achieving large output electrical power and variably controlling the output electrical power without using a DC/DC converter, and is suitably used as a resonance-type power transmitter that performs high-efficiency electric power transmission at a high frequency of 2 MHz or more.

REFERENCE SIGNS LIST

1: resonance-type power transmitter; 2: resonance-type transmission antenna; 3: resonance-type reception antenna; 4: receiver circuit; 11: resonance-type power source circuit; 11b: resonant power source circuit with built-in matching functionality; 12: phase-control-type matching circuit; 13: combining unit; 14: detection circuit; and 15: automatic matching control circuit.

The invention claimed is:

1. A resonance-type power transmitter comprising:
   resonance-type power source circuits provided for at least two electric paths, each resonance-type power source circuit having two output ends for outputting an alternating current having a frequency of 2 MHz or more;
   phase-control-type matching circuits connected to the respective resonance-type power source circuits, each phase-control-type matching circuit including an inductor that has one end being connected to one of the two output ends of a corresponding one of the resonance-type power source circuits, and a capacitor that has one end being connected to either the one end of the inductor or the other end of the inductor, the capacitor having the other end being connected to the other of the two output ends of the corresponding one of the resonance-type power source circuits; and
   a combining unit connected to the other ends of the inductors of the phase-control-type matching circuits, configured to combine outputs of the phase-control-type matching circuits.

2. The resonance-type power transmitter according to claim 1, further comprising:
   a detection circuit configured to detect a level of a composite output current obtained by the combining unit; and
   an automatic matching control circuit configured to variably control transmission characteristics of the phase-control-type matching circuits provided for the respective electric paths on a basis of a result of the detection by the detection circuit.

3. The resonance-type power transmitter according to claim 1, further comprising:
   a detection circuit configured to detect levels of currents as inputs to the resonance-type power source circuits provided for the respective electric paths; and
   an automatic matching control circuit configured to variably control transmission characteristics of the phase-control-type matching circuits provided for the respective electric paths on a basis of a result of the detection by the detection circuit.

4. The resonance-type power transmitter according to claim 1, further comprising:
   a detection circuit configured to detect levels of the output currents of the resonance-type power source circuits provided for the respective electric paths; and
   an automatic matching control circuit configured to variably control transmission characteristics of the phase-control-type matching circuits provided for the respective electric paths on a basis of a result of the detection by the detection circuit.

5. The resonance-type power transmitter according to claim 1, further comprising:
   a detection circuit configured to detect levels of output voltages of the resonance-type power source circuits provided for the respective electric paths; and
   an automatic matching control circuit configured to variably control transmission characteristics of the phase-control-type matching circuits provided for the respective electric paths on a basis of a result of the detection by the detection circuit.

6. The resonance-type power transmitter according to claim 1, further comprising:
   a detection circuit configured to detect levels of output currents of the phase-control-type matching circuits provided for the respective electric paths; and
   an automatic matching control circuit configured to variably control transmission characteristics of the phase-control-type matching circuits provided for the respective electric paths on a basis of a result of the detection by the detection circuit.

* * * * *